United States Patent
Wong et al.

(10) Patent No.: US 7,185,812 B2
(45) Date of Patent: Mar. 6, 2007

(54) PACKAGING INSPECTION AND VERIFICATION SYSTEM AND METHOD

(75) Inventors: Shoui-Liang Wong, Taipei (TW); Shan-Fa Shih, Taipei (TW); Po-Wen Lu, Taipei (TW); Min-Tzu Sung, Taipei (TW); Yi-Te Wang, Taipei (TW); Ming-Yuan Chien, Taipei (TW)

(73) Assignee: Inventec Corporation, Taipei (TW)

( * ) Notice: Subject to any disclaimer, the term of this patent is extended or adjusted under 35 U.S.C. 154(b) by 152 days.

(21) Appl. No.: 11/094,290

(22) Filed: Mar. 31, 2005

(65) Prior Publication Data

US 2006/0219782 A1    Oct. 5, 2006

(51) Int. Cl.
G06F 19/00 (2006.01)

(52) U.S. Cl. .............. 235/385; 235/383; 235/462.01; 235/470; 53/55; 53/443

(58) Field of Classification Search .............. 235/384, 235/470, 462.13; 53/55, 443
See application file for complete search history.

(56) References Cited

U.S. PATENT DOCUMENTS 5,565,858 A * 10/1996 Guthrie ................ 340/10.33
5,600,565 A * 2/1997 Wagner et al. ............. 700/219
6,371,375 B1 * 4/2002 Ackley et al. .......... 235/462.45
6,688,075 B2 * 2/2004 Cristina ........................ 53/55
7,114,655 B2 * 10/2006 Chapman et al. ...... 235/462.01

* cited by examiner

Primary Examiner—Seung Ho Lee
(74) Attorney, Agent, or Firm—Pearl Cohen Zedek Latzer, LLP

(57) ABSTRACT

A packaging inspection and verification system and method are applied to products to be packaged. An identification device reads type barcodes of the products and labels affixed to packing boxes for receiving product accessories. A processing unit obtains from a database barcodes of the accessories according to the type barcodes, and determines consistency between the labels affixed to the packing boxes and the barcodes of the accessories, if not consistent, generating a signal indicating an error occurring in the product accessories. The identification device reads ID codes of the products and labels affixed to cartons for receiving the products. The processing unit obtains from another database barcodes of the products according to the ID codes, and determines consistency between the labels affixed to the cartons and the barcodes of the products, if not consistent, generating a signal indicating an error occurring in the labels affixed to the cartons.

20 Claims, 3 Drawing Sheets

PACKAGING INSPECTION AND VERIFICATION SYSTEM AND METHOD

FIELD OF THE PRESENT INVENTION

The present invention relates to systems and methods of inspection and verification of packaged products, and more particularly, to a packaging inspection and verification system and method, which can be applied to a production line to inspect and verify products that are to be packaged prior to packaging and delivery.

BACKGROUND OF THE PRESENT INVENTION

Along with the rapid development of information networks, computers become indispensable as a part of daily life of the modern society. Due to the numerous kinds of computers that are available on the market, even computers of identical designs have the external accessories thereof in different specifications, such as keyboards, mouse, connection cords, power supplies, etc., thereby allowing different kinds of equipment to collocate with one another freely to suit and satisfy the consumers' needs.

In general, computer manufacturers produce and dispose the external accessories of computers to comply with the consumers' requirements, which are supplied by either the outside suppliers or computer manufacturers themselves. The external accessories required are usually put together in a pizza box to be collocated with a corresponding computer in a subsequent process. Prior to leaving the factory, each computer is individually packed with its matching pizza box into a standard shipping carton so as to be transported and delivered to clients.

However, due to the conventional manual operation, it is inevitable to make mistakes in the process of making pizza boxes, resulting in misplacement of products being packaged in cartons such as missing or misplacing accessories in pizza boxes or wrong model numbers that are mistakenly packaged. As computers have different model numbers and each model requires different external accessories in different specifications, computers and the external accessories thereof have different labels affixed thereto for identification purposes. Therefore, without an efficient control mechanism of an inspecting system, it is extremely difficult and ineffective to inspect the contents of each of pizza boxes in order to prevent the foregoing mistakes just by using merely manpower operation. Besides, such mistakes in packaging or delivering wrong computers or-and the matching pizza boxes thereof can easily cause great dissatisfaction and distrust from the customers and might even lose customers as a result of the failure Also, the necessity of conducting the packaging and delivery processes again owing to such mistakes will not only cause the waste of time, labor, and costs, but also severely damage and ruin the reputation of manufacturers as well.

Also, it is likely that a computer with the matching pizza box thereof could be packed into a wrong shipping carton in a packaging process. A computer barcode and a shipping label affixed to a packing carton usually comprise a code required by a client and a UPC (Universal Product Code), thereby allowing manufacturers to delivers their computer products to clients accordingly If the content of a computer. barcode does not consist with the content of a shipping label affixed to a shipping carton, which means a wrong shipping carton has been used. Without an effective control mechanism of a verification system, it is extremely difficult to distinguish the contents packed in a shipping carton to prevent mistakes by merely using manpower operation. Similarly, delivery of wrong computers can easily cause great dissatisfaction and distrust from the customers and might even lose customers as a result of the failure. And the necessity of conducting the packaging and delivery processes again owing to such mistakes cause not only the waste of time, labor, and costs, but also can severely damage and ruin the reputation of manufacturers as well.

Therefore, there exists a need to develop a system and a method for automatically inspecting and verifying packaged products prior to packaging and delivery, thereby ensuring the correctness of the contents of products as well as labels affixed to shipping cartons to decrease the mistakes to a minimum degree.

SUMMARY OF THE PRESENT INVENTION

A primary objective of the present invention is to provide a packaging inspection and verification system and method, which are easy and convenient to operate to ensure the correctness of the contents of products prior to packaging and delivery.

Another objective of the present invention is to provide a packaging inspection and verification system and method, so as to save working time and increase working efficiency.

In accordance with the above and other objectives, the present invention discloses a packaging inspection and verification system and method. The packaging inspection and verification system in the present invention includes a memory unit having a first database and a second database, an identification device, and a processing unit. The first database is used to store type barcodes of products that are to be packaged and barcodes of accessories thereof, and the second database is used to store the product ID codes of products that are to be packaged as well as a first barcode and a second barcode of the product that correspond to the product ID code; the identification device is used to read the type barcodes of products and labels affixed to the packing boxes containing accessories, allowing the processing unit to acquire barcodes of accessories that are stored in the first database according to the contents of barcodes, and also compare the barcodes with the contents of labels on packing boxes, thereby signaling to warn the staff of wrong accessories packed therein if the contents are not consistent. When accessories of a product have been correctly verified and are to be combined with the product so as to be packed into a shipping carton, the identification device is used to read the product ID code and the content of the label affixed to the shipping carton, allowing the processing unit to acquire a first barcode and a second barcode of the product from the second database according to the content of the label and to examine the consistency between the acquired barcodes of the product with the shipping label, thereby signaling to warn the staff of the wrong shipping label on the carton.

The packaging inspection and verification method is implemented using the packaging inspection and verification system The method comprises the following steps:

(0) establishing a first database for storing barcodes of product types and the corresponding accessories thereof that are to be packaged, and establishing a second database for storing codes of products as well as a first barcode and a second barcode that correspond to the product code;

(0) reading the content of a barcode of product type via an identification device and transmitting the content of the type barcode to a processing unit, allowing the processing unit to obtain barcodes of accessories that correspond to the product from the first database according to the barcode of the product type;

(0) reading the content of the label affixed to a packing box containing accessories of a product via the identification device and transmitting the content of the label to the processing unit, allowing the processing unit to compare the content of the label on the packing box with barcodes of accessories, thereby signaling to warn the staff if accessories of a product are mistakenly packed, and the step is repeated; or else step (4) is followed;

(0) reading the content of a product code via the identification device and transmitting the content of product code to the processing unit, allowing the processing unit to obtain a first barcode and a second barcode of the product from the second database according to the product code; and (0) reading the content of the label affixed to a shipping carton containing computer products via the identification device and transmitting the content of the label to the processing unit, allowing the processing unit to compare the content of the label on the shipping carton with the first and the second product codes, thereby signaling to warn the staff if a packing carton is mistakenly packed, and the step is repeated; or else the verification process is ended.

Compared to the conventional methods, the packaging inspection and verification system and method in the present invention are capable of detecting errors in the process of packaging the required accessories for computer products prior to leaving the factory, and also detecting errors in the process of packing the computer products with accessories thereof into shipping cartons prior to delivery, thereby eliminating the drawbacks encountered in the prior art.

BRIEF DESCRIPTION OF THE DRAWINGS

The present invention can be more fully understood by reading the following detailed description of the preferred embodiments, with reference made to the accompanying drawings, wherein.

DETAILED DESCRIPTION OF THE PREFERRED EMBODIMENTS

A packaging inspection and verification system and method proposed in the present invention can be applied to a process of packaging products so as to inspect and verify the contents of packaged products and accessories thereof. The accessories of a product are selected and packed into a packing box (pizza) as a set according to the requirements of a buyer, such that when leaving the factory, the pizza box containing the required accessories can be conveniently assembled together with the product into a larger shipping carton for shipment. A label is affixed to each of pizza boxes containing accessories of a product to indicate the content of accessories packed therein, and a label is affixed to each of the packing cartons to indicate codes of the product that include a first code as required by the buyer, and a second code that is a Universal Product Code (UPC) of the product.

The product mentioned above can be a computer and the accessories thereto can be a keyboard, a mouse, a power supplier, etc. all of which are assembled together as a set in accordance with the requirements of the buyer. The product can also be an electronic product of other types and detailed description based on such arrangement is given below.

Figure 1:
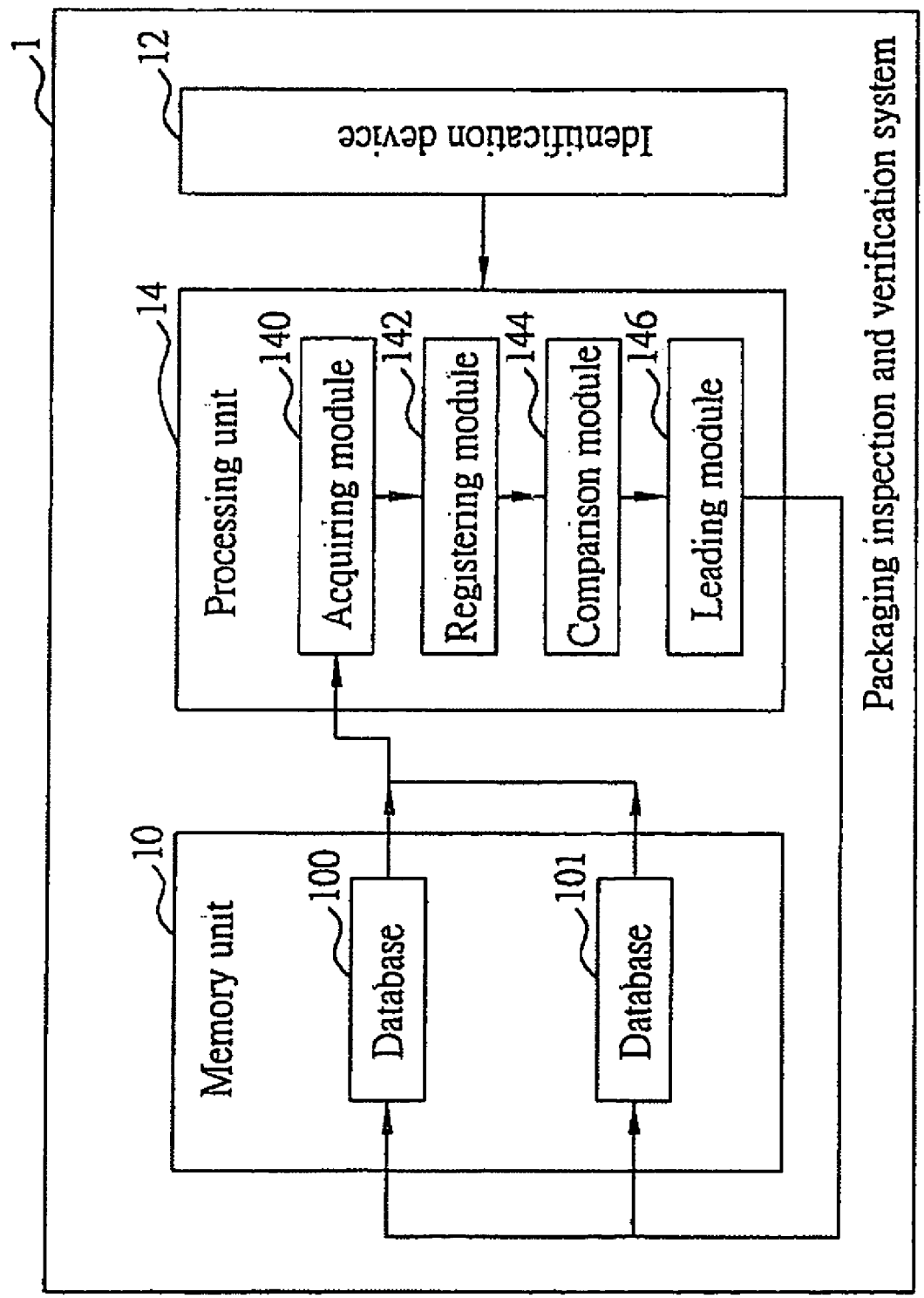
FIG. 1 is a block diagram showing basic architecture of a packaging inspection and verification system according to the present invention.

Illustrated in FIG. 1 is a basic architecture of the packaging inspection and verification system according to the present invention. As shown, the packaging inspection system 1 at least includes a memory unit 10, an identification device 12, and a processing unit 14, wherein the memory unit 10 at least includes databases 100 and 101; the processing unit 14 at least includes an acquiring module 140, a registering module 142, a comparison module 144, and a leading module 146.

The memory unit 10 can store at least a plurality of product information such as computers that are to be packaged into cartons and inspected prior to delivery. In particular, the database 100 of the memory unit 10 is used to store barcodes of product types such as computer models and computer accessories in accord with barcodes of product types (such as a keyboard, a mouse, a power supplier, etc,); whereas the database 101 is used to store codes of products, i.e. product identification (ID) codes, as well as a first barcode and a second barcode of a product in accord with the product ID code, wherein the first barcode is a code required by the buyer and the second barcode is a Universal Product Code; UPC.

The identification device 12 is used to read barcodes of product types, and further transmit the content of the type barcode to the processing unit 14, allowing the processing unit 14 to acquire and obtain from the database 100 barcodes of accessories that correspond to the type barcode according to the content of the barcode. In the meantime, the identification device 12 reads the content of the label (the barcode that indicates accessories contained in a pizza box) affixed to a pizza box containing the product accessories, and transmit the content of the label to a processing unit 14 for comparing the label of a pizza box with the obtained barcode of accessories, thereby signaling to warn the staff if there is any inconsistencies in between so that necessary actions can be taken, such as making up for a missing accessory or taking out a misplaced accessory. In this embodiment, the identification device is a scanner, however, it can also be any other types of electronic devices or equipment that has the identification functionality to suit the practical and operational needs.

As mentioned above, accessories of a computer product are assembled and supplied by manufacturers in accordance with the requirements of a buyer. In the process of assembling the product accessories, the identification device 12 reads the barcode of a product type so that the processing unit 14 can acquire and obtain barcodes of the product accessories that correspond to the type barcode; and prior to packing the product accessories into a pizza box, the identification device 12 reads the barcode of each of the required accessories, and, after assembling the required accessories, the barcode of each of the required accessories is printed out via a printing device (not shown) as a label that is to be affixed to each of pizza boxes for identification of the contents packed therein. Thereby, when inspecting accessories of a product, the identification device 12 can directly read the barcode of each of the required accessories that is affixed to each pizza box without having to open every pizza box containing accessories of a product, and further transmit the content of the barcode to the processing unit 14 for subsequent handling and arrangement, thereby saving time and increasing efficiency as a result.

After the content of product accessories packed in a pizza box has been inspected and verified, the product can be packed with the pizza box containing the required accessories of the product into a shipping carton for shipment. Subsequently, the identification device 12 reads a product ID code and transmits the content of the product ID code to the processing unit 14, allowing the processing unit 14 to acquire a first code and a second code of the product from the database 101 in accord with the product ID code according to the content of the product ID code; at the same time, the identification device 12 reads the label affixed to the shipping carton (ice. the content of the first code and the second code of the product) and transmits the content of the label to the processing unit 14 so as to compare the content of the label with the first and the second codes of the product, thereby signaling to warn the staff if there is any inconsistencies in between so that necessary actions can be taken such as substituting a wrong label with a correct one.

The operation of the processing unit 14 is further detailed with other necessary elements herein. The acquiring module 140 is used to acquire barcodes of product accessories from the database 100 according to the barcode of a product type that is transmitted from the identification device 12, and further transmit the acquired barcodes to a registering module 142 for temporary storage; and further acquire from the database 101 a first code and a second code of a product according to the barcode of a product type and transmit the obtained codes to the registering module 142 for temporary storage.

The registering module 142 is used to temporarily store the contents of labels affixed to the pizza boxes transmitted from the identification device 12, the contents of labels affixed to the shipping cartons transmitted from the identification device 12, as well as the contents obtained by the acquiring module 140 from the databases 100 and 101.

The comparison module 144 is used to compare the contents of labels affixed to pizza boxes with the contents of labels affixed to shipping cartons that are temporarily stored in the registering module 142, and also compare the contents of labels affixed to shipping cartons with a first code and a second code of a product, thereby signaling to warn the staff if there is any inconsistencies in between so as to make corrections in time.

Figure 2:
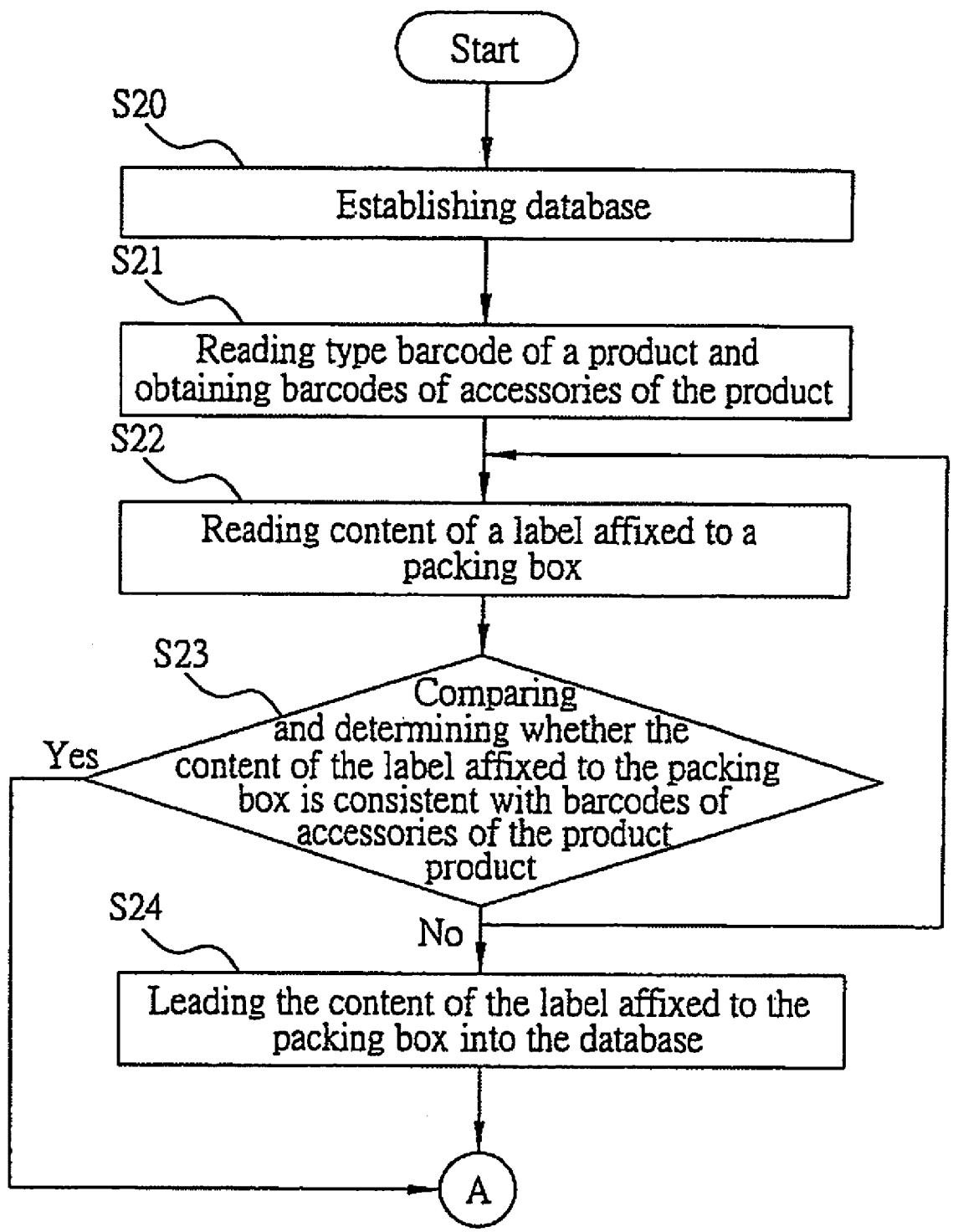
FIG. 2 is a flowchart showing steps involved in disposing product accessories into a pizza in the use of a packaging inspection and verification method according to the present invention.

As mentioned above, the processing unit 14 further includes a leading module 146 which is used to lead the contents of labels affixed to the shipping cartons that are stored in the registering module 142 when the comparison module 144 detects and signals to warn any inconsistencies into a specific position in the database 100 for future tracking purposes As mentioned above, the processing unit 14 further includes a leading module 146. When the comparison module 144 detects and signals to warn any inconsistencies of the contents, the leading module 146 is used to lead the contents of labels affixed to the pizza boxes that contain accessories of products stored in the registering module 142 into a specific position in the database 100 for future tracking purposes; similarly, the leading module 146 is also used to lead the contents of labels affixed to the shipping cartons that contain the first and the second codes of products stored in the registering module 142 into a specific position in the database 101 for future tracking purposes By using the packaging inspection and verification system 1 of the present invention, steps of the packaging inspection and verification method 2 are implemented as illustrated in FIG. 2.

In step S20, a database 100 is established to store the code of a product type, and the code of an accessory of the product in accord with the type code, and a database 101 is established to store the product ID code, and a first code and a second code of the product, wherein the first code is a code required by the buyer and the second code is a Universal Product Code; UPC. Thereafter, step S21 is followed.

In step S21, an identification device 12 reads the type code of the product and transmits the content of the type code to an acquiring module 140, allowing the acquiring module 140 to acquire from the database 100 codes of accessories of the product and further stores the accessory codes in a registering module 142 according to the type code. Thereafter, step S22 is proceeded.

In step S22, the identification device 12 reads the content of the label affixed to a pizza box that contains accessories of a product and transmits the content of the label to a registering module 142 for temporary storage.

In step S23, the comparison module 144 compares the content of the label affixed to the pizza box with codes of accessories of the product, and, if any inconsistencies between the contents are found, it generates a signal to warn the staff so that necessary corrections can be made such as making up for the missing accessory and taking out the misplaced accessory, and then it returns to step S22; otherwise, if the contents are consistent, it proceeds to the subsequent process of packaging and verification. However, if the packaging inspection and verification method is only applied to a product and accessories thereof that are packed in a pizza box but not a shipping carton that contains both the product and the pizza box, the verification process is ended.

As mentioned above, when the comparison module 144 detects an inconsistency between the contents, subsequently step S24 is proceeded after the step S23. The leading module 146 proceeds to lead the content of the label containing accessories of the product that is temporarily stored in the registering module 142 into the database 100, allowing the staff to follow up and check afterwards.

Figure 3:
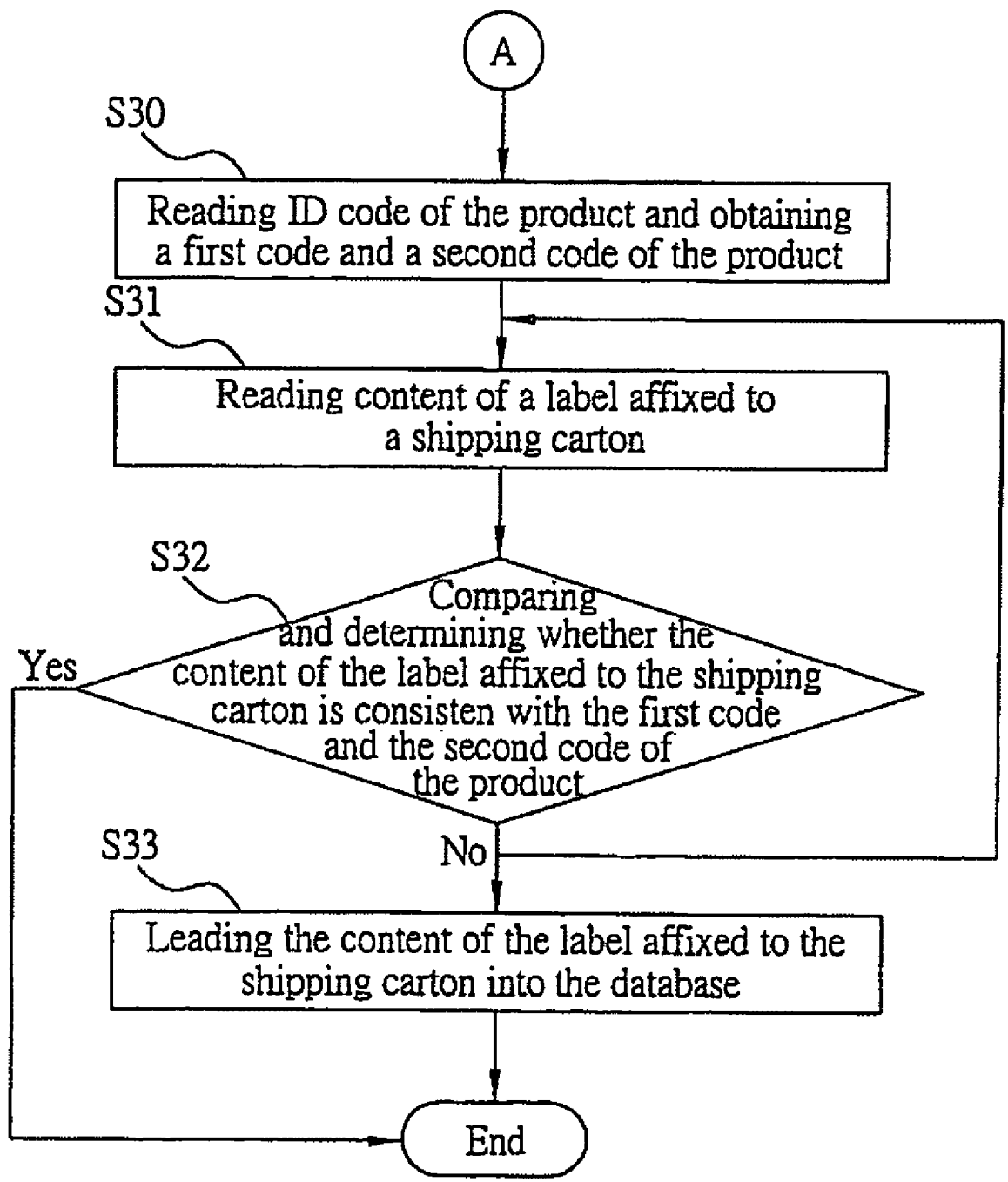
FIG. 3 is a flowchart diagram showing steps involved in disposing products into a packing carton in the use of the packaging inspection and verification method according to the present invention.

FIG. 3 illustrates the detailed steps involved in disposing products into a packing carton in proceeding the packaging inspection and verification method.

As shown in FIG. 3, firstly in step S30, the identification device 12 reads the product ID code of the product and transmits the content of the product ID code to an acquiring module 140, allowing the acquiring module to obtain a first code and a second code of the product according to the content of product ID code, and further transmit the first and the second codes of the product to a registering module 142 for temporary storage. Thereafter, step 31 is followed.

In step S31, the identification device 12 reads the content of the label affixed to the shipping carton and transmits the content of the label to a registering module 142 for temporary storage. Thereafter, step 32 is followed.

In step S32, the comparison module 140 compares the content of the label affixed to the shipping carton with the first and the second codes of the product, and, if any inconsistencies between the contents is found, it generates a signal to warn the staff so that necessary corrections can be made such as replacing the erroneous label with a correct one, and then it returns to step S31 for verification of packaging again; otherwise, if the contents are consistent and correct, it ends the verification process and proceeds to the subsequent process of delivering the product.

As mentioned above, when the comparison module 144 detects any inconsistencies between the contents, step S33 is proceeded following step S32 such that the leading module 146 proceeds to lead the content of the label affixed to the shipping carton (the first and the second codes of the product) that are temporarily stored in the registering module 144 into the database 101 for future tracking.

Compared to the conventional methods of disposing the product accessories in a pizza box and the products in a shipping carton, the packaging inspection and verification system and method of the present invention can early detect errors and inconsistencies from the contents of labels affixed to pizza boxes and accessory codes stored in the database to reduce unnecessary loss caused by misplacing products and accessories thereof.

Further, the inspection and verification system and method of the present invention can directly conduct the verification process of product packaging without having to open every pizza box that contains accessories of a product, thereby providing an easier and more convenient operation to save time and increase efficiency as a result. In addition, the present invention provides a leading module for leading the inconsistent contents after comparison into a database for future tracking can help to increase controllability and maintainability of product packaging as well.

The invention has been described using exemplary preferred embodiments. However, it is to be understood that the scope of the present invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. A packaging inspection and verification system, comprising:
    a memory unit including a first database and a second database, the first database for storing type barcodes of products that are to be packaged and barcodes of accessories of the products corresponding to the type barcodes, and the second database for storing identification (ID) codes of the products that are to be packaged and first barcodes and second barcodes of the products corresponding to the ID codes;
    an identification device for reading the type barcodes of the products and content of labels affixed to packing boxes for receiving the accessories of the products, and further for reading content of the ID codes of the products and content of labels affixed to cartons for receiving the products; and
    a processing unit for receiving the type barcodes of the products and the content of the labels affixed to the packing boxes from the identification device, so as to obtain the barcodes of the accessories of the products from the first database according to the type barcodes, and further compare the obtained barcodes of the accessories with the content of the labels affixed to the packing boxes, if the obtained barcodes of the accessories are not consistent with the content of the labels, generating a signal indicating an error occurring in the accessories of the products; and the processing unit further for receiving the content of the ID codes of the products and the content of the labels affixed to the cartons from the identification device, so as to obtain the first codes and the second codes of the products from the second database according to the content of the ID codes and compare the obtained first codes and second codes with the content of the labels affixed to the cartons, if the obtained first codes and second codes are not consistent with the content of the labels, generating a signal indicating an error occurring in the labels affixed to the cartons for the products.

2. The packaging inspection and verification system of claim 1, wherein the processing unit comprises:
    an acquiring module for obtaining the barcodes of the accessories of the products from the first database according to the type barcodes of the products;
    a registering module for storing the content of the labels affixed to the packing boxes read by the identification device and the barcodes of the accessories of the products obtained by the acquiring module; and
    a comparison module for comparing and determining the consistency between the content of the labels affixed to the packing boxes and the barcodes of the accessories stored in the registering module, and generating the signal indicating an error occurring in the accessories of the products if the consistency is not achieved.

3. The packaging inspection and verification system of claim 2, wherein the processing unit further comprises a leading module for leading the content of the labels affixed to the packing boxes stored in the registering module into the first database when the inconsistency is achieved.

4. The packaging inspection and verification system of claim 1, wherein the processing unit comprises:
    an acquiring module for obtaining the first codes and the second codes of the products from the second database according to the content of the ID codes of the products;
    a registering module for storing the content of the labels affixed to the cartons read by the identification device and the first codes and the second codes of the products obtained by the acquiring module; and
    a comparison module for comparing and determining the consistency between the content of the labels affixed to the cartons stored in the registering module and the first codes and the second codes of the products, and generating the signal indicating an error occurring in the labels affixed to the cartons if the consistency is not achieved.

5. The packaging inspection and verification system of claim 4, wherein the processing unit further comprises a leading module for leading the content of the labels affixed to the cartons stored in the registering module into the second database when the consistency is not achieved.

6. The packaging inspection and verification system of claim 1, wherein the products are computers, and the accessories thereof comprise at least one selected from the group consisting of keyboard, mouse and power supplier.

7. The packaging inspection and verification system of claim 1, wherein the first barcode is a product barcode required by a buyer.

8. The packaging inspection and verification system of claim 1, wherein the second barcode is a Universal Product Code (UPC).

9. The packaging inspection and verification system of claim 1, wherein the content of the labels affixed to the packing boxes comprises the barcodes of the accessories of the products to be packaged in the packing boxes.

10. The packaging inspection and verification system of claim 1, wherein the content of the labels affixed to the cartons comprises the first codes and the second codes of the products.

11. A packaging inspection and verification method applied to a packaging inspection and verification system, the packaging inspection and verification system comprising a memory unit having a first database and a second database, an identification device and a processing unit, the method comprising the steps of:
   (1) establishing the first database for storing type barcodes of products that are to be packaged and barcodes of accessories of the products corresponding to the type barcodes, and establishing the second database for storing identification (ID) codes of the products that are to be packaged and first barcodes and second barcodes corresponding to the ID codes of the products;
   (2) having the identification device read the type barcodes of the products and transmit the read type barcodes to the processing unit, so as to allow the processing unit to obtain the barcodes of the accessories of the products from the first database according to the type barcodes;
   (3) having the identification device read content of labels affixed to packing boxes for receiving the accessories of the products and transmit the read content of the labels affixed to the packing boxes to the processing unit,
   (4) having the processing unit compare and determine whether the content of the labels affixed to the packing boxes transmitted from the identification device is consistent with the obtained barcodes of the accessories of the products, if no, generating a signaling indicating an error occurring in the accessories of the products and returning to step (3); or if yes, proceeding to step (5);
   (5) having the identification device read content of the ID codes of the products and transmit the read content of the ID codes to the processing unit, so as to allow the processing unit to obtain the first barcodes and the second barcodes of the products from the second database according to the content of the ID codes;
   (6) having the identification device read content of labels affixed to cartons for receiving the products and transmit the read content of the labels affixed to the cartons to the processing unit; and
   (7) having the processing unit compare and determine whether the content of the labels affixed to the cartons transmitted from the identification device is consistent with the first codes and the second codes of the products, if no, generating a signal indicating an error occurring in the labels affixed to the cartons and returning to step (6); or if yes, ending the packaging inspection and verification method.

12. The packaging inspection and verification method of claim 11, wherein the processing unit comprises:
   an acquiring module for obtaining the barcodes of the accessories of the products from the first database according to the type barcodes of the products transmitted from the identification device;
   a registering module for storing the content of the labels affixed to the packing boxes transmitted from the identification device and the barcodes of the accessories of the products obtained by the acquiring module; and
   a comparison module for comparing and determining the consistency between the content of the labels affixed to the packing boxes and the barcodes of the accessories stored in the registering module, and generating the signal indicating an error occurring in the accessories of the products if the consistency is not achieved.

13. The packaging inspection and verification method of claim 12, wherein the processing unit further comprises a leading module, and the packaging inspection and verification method further comprises a step of having the leading module lead the content of the labels affixed to the packing boxes stored in the registering module into the first database when the inconsistency is not achieved.

14. The packaging inspection and verification method of claim 11, wherein the processing unit comprises:
   an acquiring module for obtaining the first codes and the second codes of the products from the second database according to the content of the ID codes of the products transmitted from the identification device;
   a registering module for storing the content of the labels affixed to the cartons transmitted from the identification device and the first codes and the second codes of the products obtained by the acquiring module; and
   a comparison module for comparing and determining the consistency between the content of the labels affixed to the cartons stored in the registering module and the first codes and the second codes of the products, and generating the signal indicating an error occurring in the labels affixed to the cartons if the consistency is not achieved.

15. The packaging inspection and verification method of claim 14, wherein the processing unit further comprises a leading module, and the packaging inspection and verification method further comprises a step of having the leading module lead the content of the labels affixed to the cartons stored in the registering module into the second database when the consistency is not achieved.

16. The packaging inspection and verification method of claim 11, wherein the products are computers, and the accessories thereof comprise at least one selected from the group consisting of keyboard, mouse and power supplier.

17. The packaging inspection and verification method of claim 11, wherein the content of the labels affixed to the cartons comprises the first codes and the second codes of the products.

18. The packaging inspection and verification method of claim 11, wherein the first barcode is a product code required by a buyer.

19. The packaging inspection and verification method of claim 11, wherein the second code is a Universal Product Code (UPC).

20. The packaging inspection and verification method of claim 11, wherein the content of the labels affixed to the packing boxes comprises the barcodes of the accessories of the products to be packaged in the packing boxes.

* * * * *